L. McCARTHY.
HICKEY.
APPLICATION FILED OCT. 18, 1915.

1,215,562.

Patented Feb. 13, 1917.

INVENTOR:
Louis McCarthy
by Macleod, Calver, Copeland & Dike
Attys.

UNITED STATES PATENT OFFICE.

LOUIS McCARTHY, OF BOSTON, MASSACHUSETTS, ASSIGNOR TO THE MACALLEN COMPANY, OF BOSTON, MASSACHUSETTS, A CORPORATION OF MASSACHUSETTS.

HICKEY.

1,215,562.

Specification of Letters Patent.　　Patented Feb. 13, 1917.

Application filed October 18, 1915.　Serial No. 56,391.

*To all whom it may concern:*

Be it known that I, LOUIS MCCARTHY, a citizen of the United States, residing at Boston, county of Suffolk, State of Massachusetts, have invented a certain new and useful Improvement in Hickeys, of which the following is a specification, reference being had therein to the accompanying drawings.

My invention has for its object the production of a new and improved form of split hickey which is adapted to be employed for attaching a chandelier or the like to an insulating coupling secured to the wall or ceiling. As is well known to those skilled in the art the use of a split hickey permits the wires in the chandelier to be inserted through the hickey so that it may be screwed onto the chandelier and thereafter enables them to be readily drawn out through the cut away portion at one end of the hickey into the side opening as is necessary in order that they may be passed around the insulating joint. Hickeys of this type are weakened by reason of the cut away portion so that the threaded connection between the split end of the hickey and the insulating joint has a tendency to work loose. An attempt has been made to overcome this objection by threading the split end of the hickey into the insulating joint so that the insulating joint engages with the members connecting the ends of the hickey together and serves as a support to strengthen the weakened end of the hickey. It was found however that this did not strengthen the hickey for the split end being unsupported on the inside had a tendency to collapse and therefore to work loose. The hickey embodying my invention is adapted to be threaded over the end of the insulating joint so that the split end is prevented from collapsing and is provided on its exterior with a pipe thread adapted to receive a correspondingly threaded nut which may be screwed down on the split end of the hickey and clamp it firmly against the end of the insulating joint within.

I am aware of the fact that a split reinforcing band with a screw connection has heretofore been used to reinforce the split member but this does not overcome the objection referred to for the band has a tendency to spring and pivot on the screw and thereby to allow the springing action to take place. For example, if the hickey is subjected to a lateral strain at the lower end the inner end of the split end member will have a tendency to spread and the split reinforcing band will also have a tendency to spread at its lower edge. This it will be allowed to do owing to the fact that it is merely secured together by a screw and therefore may turn about the screw as a pivot. Furthermore sufficient pressure cannot be obtained to clamp the parts tightly together as is the case with the device embodying my invention.

My invention will be fully understood from the following description when taken in connection with the accompanying drawings and the novel features thereof will be pointed out and clearly defined in the claim at the close of this specification.

In the drawings, Figure 1 is a view of a split hickey embodying my invention.

Figure 1:
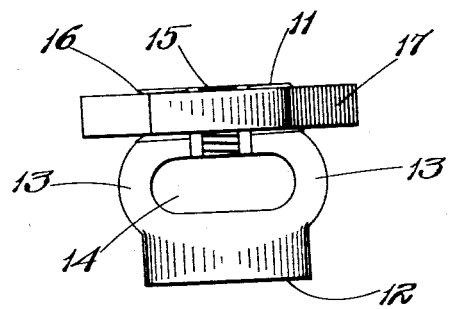
Figure 2:
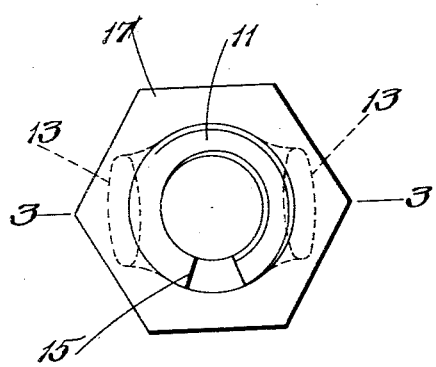
Fig. 2 is a plan view of the hickey shown in Fig. 1.
Figure 4:
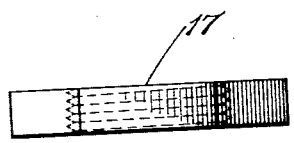
Fig. 4 is a view of the reinforcing member.
Figure 5:
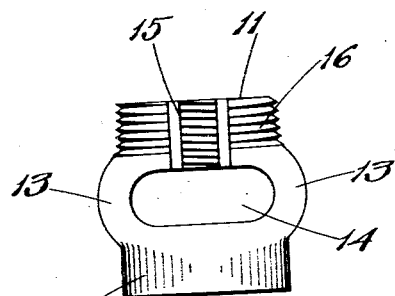
Fig. 5 is a view of a split hickey with the reinforcing member removed.
Figure 3:
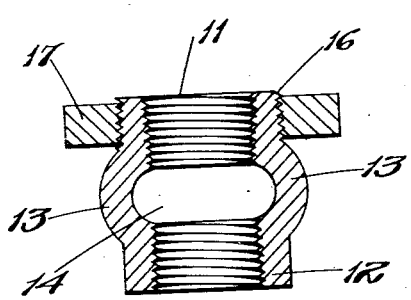
Fig. 3 is a section on line 3—3 of Fig. 2.

Having reference to the drawings there is shown a hickey consisting of tubular end members 11 and 12 having integral connecting members 13 with a side opening 14 between them for the wires to project through in order to surround an insulating joint. The end members 11 and 12 are threaded internally as is clearly shown in Fig. 3 for the reception of the stem of an insulating joint and a chandelier not shown. A slot or cut away portion 15 is provided in the upper end member 11 which connects the opening 14 with the upper end of the hickey to enable the wires which necessarily extend through the hickey while it is being screwed onto the stem of the chandelier to be removed from the upper end into the opening 14. The slot 15 destroys the continuity of the member 11 and materially weakens it so that after it has been screwed onto the stem of the insulating joint it has a tendency to spring and twist under the stress and strain to which it is of necessity subjected.

The member 11 is provided with external pipe threads 16 which extend from the top of the member to the point at which the connecting members 13 are joined to it and a relatively heavy nut 17 having threads corresponding to those about the member 11 is screwed onto the member. The nut 17 spans the opening 15 and forms a solid reinforcing member completely around the member 11 which is heavy and strong and being continuous entirely eliminates any springing or twisting action in the hickey. The pipe threads 16 taper toward the outer edge of the split end 11 of the hickey as shown. When the nut 17 is put on and screwed down the split end of the hickey is pressed inwardly and wedged tightly between the nut and the end of the insulating joint. This construction eliminates all tendency to spring and work loose for the split end of the hickey is clamped between the end of the insulating joint and the nut and the parts are held rigidly in position.

What I claim is:

The improved hickey comprising tubular end members connected together with an opening between them, one of said end members being split from the outer edge thereof to the said opening, internal threads on said split end member tapering outwardly toward the outer edge thereof and adapted to receive the correspondingly threaded end of an insulating joint, external threads on said split end member tapering inwardly to the outer edge thereof, and a nut having threads tapering to correspond to said external threads, said nut being adapted to be screwed onto said split end member and thereby to wedge it inwardly and together with the oppositely tapering end of the insulating joint to clamp the split end securely in position.

In testimony whereof I affix my signature, in presence of two witnesses.

LOUIS McCARTHY.

Witnesses:
CAMERON MACLEOD,
J. E. SCALLAN.